(12) United States Patent
Hashimoto et al.

(10) Patent No.: US 11,093,801 B2
(45) Date of Patent: Aug. 17, 2021

(54) OBJECT DETECTION DEVICE AND OBJECT DETECTION METHOD

(71) Applicant: TOYOTA JIDOSHA KABUSHIKI KAISHA, Toyota (JP)

(72) Inventors: Daisuke Hashimoto, Chofu (JP); Satoshi Takeyasu, Musashino (JP); KOta Hirano, Tokyo-tu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 16/545,373

(22) Filed: Aug. 20, 2019

(65) Prior Publication Data

US 2020/0097756 A1 Mar. 26, 2020

(30) Foreign Application Priority Data

Sep. 26, 2018 (JP) .............................. JP2018-181002

(51) Int. Cl.
*G06K 9/62* (2006.01)
*G06K 9/32* (2006.01)
*G06K 9/00* (2006.01)

(52) U.S. Cl.
CPC ......... *G06K 9/627* (2013.01); *G06K 9/00805* (2013.01); *G06K 9/3233* (2013.01)

(58) Field of Classification Search
CPC ............... G06T 7/262; G06K 9/00624; G06K 9/00825; G06K 9/00791
See application file for complete search history.

(56) References Cited

U.S. PATENT DOCUMENTS

2019/0258878 A1* 8/2019 Koivisto ................. G05D 1/00
2020/0225672 A1* 7/2020 Silva ............... B60W 60/00272

OTHER PUBLICATIONS

Wei Liu et al., "SSD: Single Shot MultiBox Detector," ECCV2016, 2016, pp. 1-17.
Shaoqing Ren et al., "Faster R-CNN: Towards Real-Time Object Detection with Region Proposal Networks," NIPS, 2015, pp. 1-14.
Alex Kendall et al., "Multi-Task Learning Using Uncertainty to Weigh Losses for Scene Geometry and Semantics," CVPR2018, 2018, pp. 1-14.

* cited by examiner

*Primary Examiner* — Ross Varndell
(74) *Attorney, Agent, or Firm* — Sughrue Mion, PLLC

(57) ABSTRACT

An object detection device includes a processor configured to calculate, for each of a plurality of regions in an input image, a confidence indicating a degree of certainty that an object to be detected is represented; determine that the object is represented in a first region for which the confidence is equal to or higher than a first confidence threshold; calculate an occlusion ratio of an occluded region, in which the object is occluded in the first region by another object, to the first region; and determine that the object to be detected is represented in a second region which at least partially overlaps with the first region, when the occlusion ratio is equal to or higher than an occlusion ratio threshold and the confidence for the second region is equal to or higher than a second confidence threshold which is lower than the first confidence threshold.

10 Claims, 7 Drawing Sheets

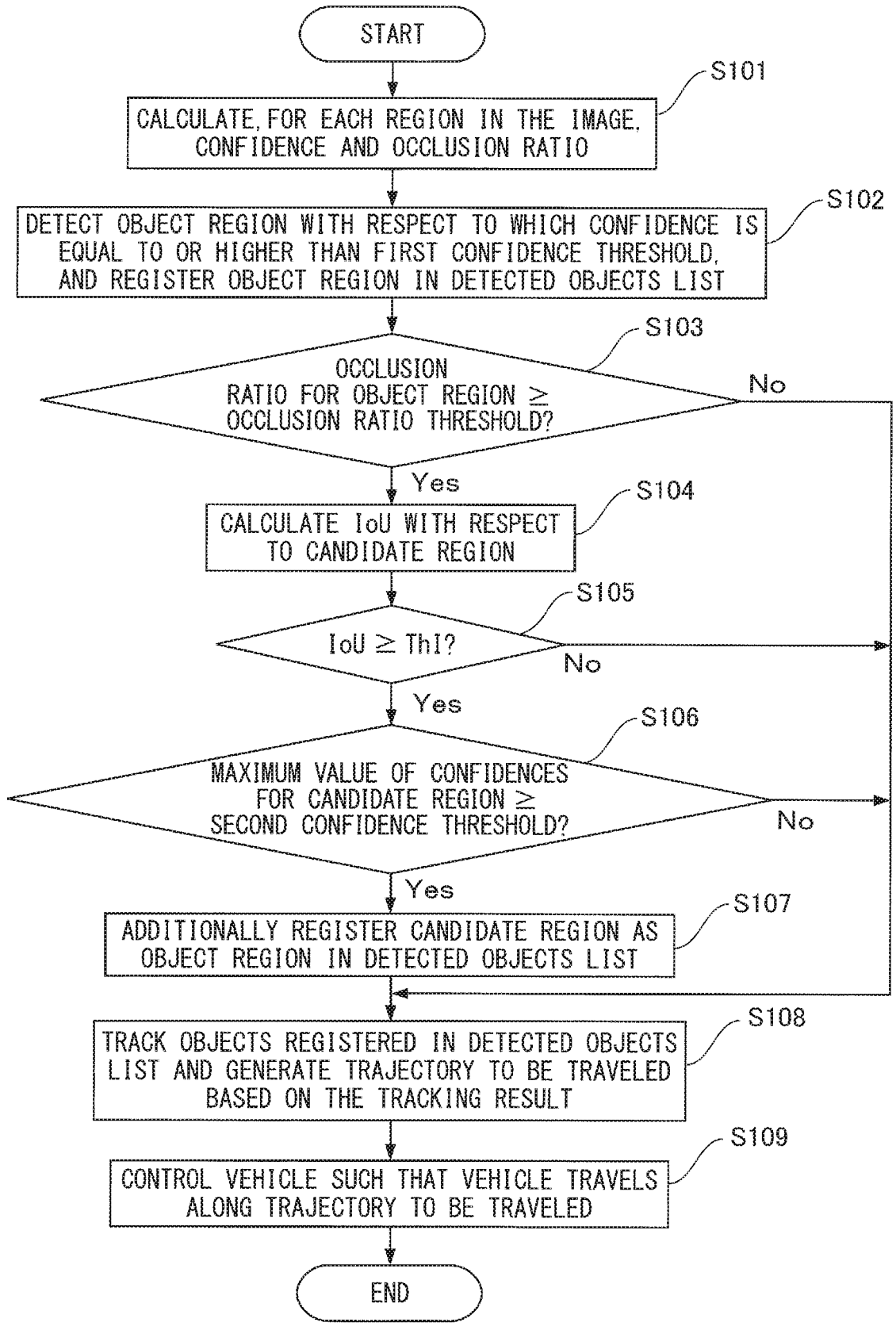

OBJECT DETECTION DEVICE AND OBJECT DETECTION METHOD

FIELD

The present invention relates to an object detection device, an object detection method, and a computer program for object detection for detecting an object represented in an image.

BACKGROUND

Techniques for detecting an object represented in an image have been studied. In recent years, in order to detect an object, there have been proposed techniques for improving detection accuracy using a so-called deep neural network (hereinafter, referred to simply as DNN) (see, for example, Wei Liu et al., "SSD: Single Shot MultiBox Detector", ECCV2016, 2016 (hereinafter, referred to as NPL 1), Shaoqing Ren et al., "Faster R-CNN: Towards Real-Time Object Detection with Region Proposal Networks", NIPS, 2015 (hereinafter, referred to as NPL 2), and Alex Kendall et al., "Multi-Task Learning Using Uncertainty to Weigh Losses for Scene Geometry and Semantics", CVPR2018, 2018 (hereinafter, referred to as NPL 3)).

SUMMARY

In such techniques, a DNN has been learned using, as teacher data, multiple images in which a known object is represented, as a result, the DNN will be able to detect the known object represented in an input image with a high degree of accuracy. However, there is a case in which an object to be detected is an object for which only a small number of images can be used as teacher data. For images in which such an object is represented, the detection accuracy achieved by the DNN is reduced. There is also a case in which the detection accuracy achieved by the DNN is reduced for an image in which a known object looks differently from the way the known object looks in an image included in teacher data. To prevent deterioration in detection accuracy, it is preferable that, for each of all objects to be detected, an image in which the object is represented can be used as teacher data. In fact, however, it may not be possible to prepare, for each of all objects to be detected, an image that can be used as teacher data when the DNN is learned. Therefore, it is desired to improve detection accuracy even for an object for which only a small number of images can be used as teacher data or an image in which an object to be detected looks differently from the way the object looks in an image included in teacher data.

Thus, an object of the present invention is to provide an object detection device that can improve accuracy in object detection.

According to one embodiment, an object detection device is provided. The object detection device includes a processor configured to: calculate, for each of a plurality of regions in an input image, a confidence indicating a degree of certainty that an object to be detected is represented; determine that the object to be detected is represented in a first region, among the plurality of regions, with respect to which the confidence is equal to or higher than a first confidence threshold; calculate an occlusion ratio indicating a ratio of an occluded region, in which the object to be detected is occluded in the first region by another object, to the first region; and determine that the object to be detected is represented in a second region, among the plurality of regions, which at least partially overlaps with the first region, when the occlusion ratio is equal to or higher than an occlusion ratio threshold and the confidence with respect to the second region is equal to or higher than a second confidence threshold which is lower than the first confidence threshold.

In the object detection device, the processor preferably calculates the occlusion ratio by inputting the image to a classifier that has been learned in advance in such a way as to detect the object in the image and to detect the occluded region.

In this case, the classifier preferably includes a first convolutional neural network to which the image is input, a second convolutional neural network that calculates the confidence with respect to each of the plurality of regions on the basis of an output from the first convolutional neural network, and a third convolutional neural network that detects the occluded region on the basis of an output from the first convolutional neural network.

In addition, in the object detection device, the processor preferably determines that the object to be detected is represented in the second region, when a ratio of an overlapped region between the first region and the second region to a sum set of the first region and the second region is equal to or higher than a predetermined threshold and the confidence with respect to the second region is equal to or higher than the second confidence threshold.

Alternatively, the processor preferably determines that the object to be detected is represented in the second region, when a ratio of an overlapped region between the first region and the second region to the first region is equal to or higher than a predetermined threshold and the confidence with respect to the second region is equal to or higher than the second confidence threshold.

Alternatively, the processor preferably determines a region, among the plurality of regions, which at least partially overlaps with the first region and which includes at least part of the occluded region as the second region.

Furthermore, the processor preferably estimates a type of the object represented in the first region and sets the occlusion ratio threshold in accordance with the type.

Still further, the processor preferably sets the second confidence threshold to a lower value as the occlusion ratio is higher.

Alternatively, the processor preferably sets the second confidence threshold in accordance with a relative positional relationship of the second region relative to the first region.

According to another embodiment of the present invention, an object detection method is provided. The object detection method includes calculating, for each of a plurality of regions in an input image, a confidence indicating a degree of certainty that an object to be detected is represented, determining that the object to be detected is represented in a first region, among the plurality of regions, with respect to which the confidence is equal to or higher than a first confidence threshold, calculating an occlusion ratio indicating a ratio of an occluded region, in which the object to be detected is occluded in the first region by another object, to the first region, and determining that the object to be detected is represented in a second region, among the plurality of regions, which at least partially overlaps with the first region, when the occlusion ratio is equal to or higher than an occlusion ratio threshold and the confidence with respect to the second region is equal to or higher than a second confidence threshold which is lower than the first confidence threshold.

According to still another embodiment of the present invention, a non-transitory computer-readable recording medium having recorded thereon a computer program for object detection is provided. The computer program for object detection includes instructions that cause a computer to execute a process including: calculating, for each of a plurality of regions in an input image, a confidence indicating a degree of certainty that an object to be detected is represented, determining that the object to be detected is represented in a first region, among the plurality of regions, with respect to which the confidence is equal to or higher than a first confidence threshold, calculating an occlusion ratio indicating a ratio of an occluded region, in which the object to be detected is occluded in the first region by another object, to the first region, and determining that the object to be detected is represented in a second region, among the plurality of regions, which at least partially overlaps with the first region, when the occlusion ratio is equal to or higher than an occlusion ratio threshold and the confidence with respect to the second region is equal to or higher than a second confidence threshold which is lower than the first confidence threshold.

The object detection device according to the present invention provides an advantageous effect that accuracy in object detection can be improved.

BRIEF DESCRIPTION OF DRAWINGS

FIG. 7 is an operation flowchart of the vehicle control process that includes the object detection process.

DESCRIPTION OF EMBODIMENTS

Figure 1:
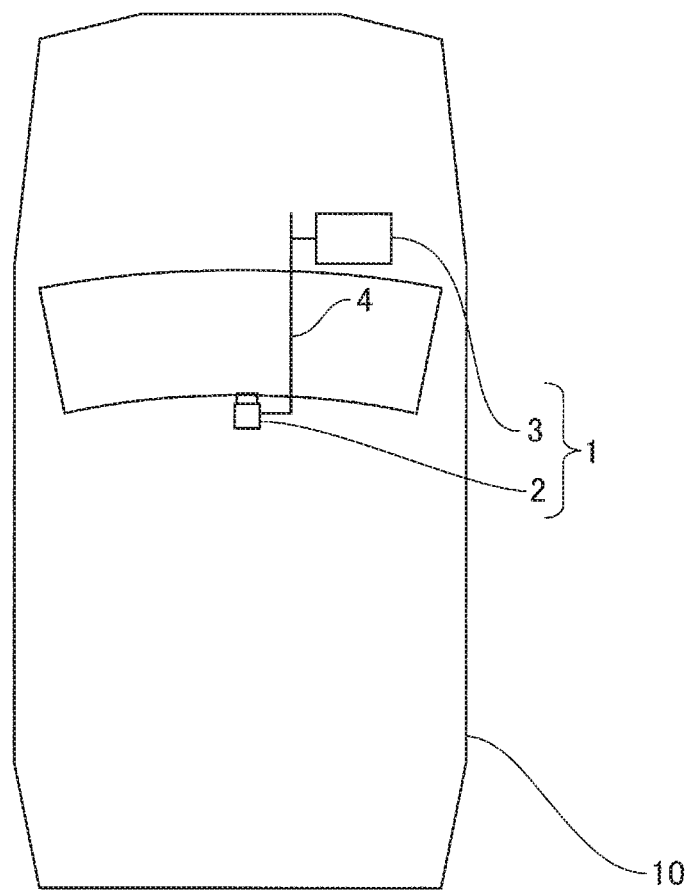
FIG. 1 is a schematic configuration diagram of a vehicle control system in which an object detection device is installed.

With reference to the drawings, an object detection device will be described below. The inventors have taken particular note of a fact that it is highly likely that, when part of an object detected in an image is not viewable in the image, another object occluding the object is captured in the image. In view of this, the object detection device relaxes, when it is estimated that part of the object detected in the image is occluded by another object of some kind, a detection condition for the another object occluding the detected object. In this manner, the object detection device enables detection of the another object even when the another object is one of such objects that a classifier for object detection cannot be sufficiently learned (hereinafter, referred to as a rare object for the sake of convenience) though the another object is an object to be detected. Specifically, the object detection device calculates, by inputting an image to a classifier that has been learned in advance in such a way as to detect the object represented in the image, for various regions in the image, a confidence indicating a degree of certainty that the object to be detected is represented, and determines that the object to be detected is represented in a region with respect to which the calculated confidence is equal to or higher than a first confidence threshold (hereinafter, the region in which the detected object is represented is referred to as an object region for the sake of convenience). In addition, the object detection device calculates a ratio of an area of an occluded region in which the object detected in the object region is occluded by another object to an area of the object region (hereinafter, referred to as an occlusion ratio for the sake of convenience). When the occlusion ratio is equal to or higher than a predetermined threshold and a ratio of an area of an overlapped region between the object region and a region that at least partially overlaps with the object region and with respect to which the confidence has been calculated (hereinafter, referred to as a candidate region for the sake of convenience) to an area of a sum set of the object region and the candidate region is equal to or higher than a predetermined threshold, the object detection device applies a second confidence threshold, which is lower than the first confidence threshold, to the candidate region. Then, the object detection device determines, when the confidence calculated with respect to the candidate region is equal to or higher than the second confidence threshold, that an object to be detected is also represented in the candidate region. In this manner, even if a rare object is captured in the candidate region, the object detection device can prevent failure in detecting the rare object to improve detection accuracy. Note that the rare object may include an object that is not represented in any of images included in teacher data even though the object should be an object to be detected, i.e., an unknown object.

An example of the object detection device applied to a vehicle control system will be described below. In this example, the object detection device detects, by executing an object detection process on an image acquired by a camera installed in a vehicle, various types of objects that exist around the vehicle, for example, other vehicles, human beings, road signs, road markings, or the like. In this example, the rare object includes, for example, a vehicle having a peculiar shape, a vehicle carrying a peculiar load, an unusually dressed person, an animal other than human beings, or various types of fallen objects fallen on the road.

Figure 2:
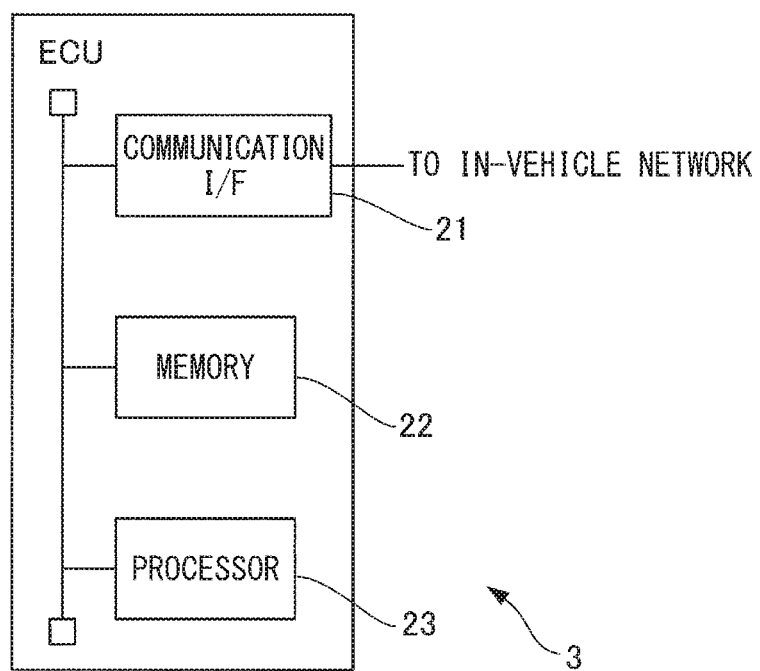
FIG. 2 is a hardware configuration diagram of an electronic control unit, which is an embodiment of the object detection device.

FIG. 1 is a schematic configuration diagram of the vehicle control system in which the object detection device is installed. FIG. 2 is a hardware configuration diagram of an electronic control unit, which is an embodiment of the object detection device. In the present embodiment, a vehicle control system 1 that is installed in a vehicle 10 and controls the vehicle 10 includes a camera 2 for imaging the surroundings of the vehicle 10 and an electronic control unit (ECU) 3, which is an example of the object detection device. The camera 2 and the ECU 3 are communicatively connected via an in-vehicle network 4 conforming to a standard such as the Controller Area Network.

The camera 2 is an example of an imaging unit and includes a two-dimensional detector configured with an array of photoelectric conversion elements having sensitivity to visible light such as a CCD image sensor or a C-MOS image sensor and an imaging optical system that forms an image of a region to be imaged on the two-dimensional detector. The camera 2 is mounted in such a way that it is oriented in the front direction of the vehicle 10, for example, in a vehicle interior of the vehicle 10. The camera 2 captures a region ahead of the vehicle 10 at every predetermined imaging period (for example, 1/30 seconds to 1/10 seconds)

and generates an image in which the region ahead is captured. The image acquired by the camera 2 may be a color image or a gray image.

Every time the camera 2 generates an image, the camera 2 outputs the generated image to the ECU 3 via the in-vehicle network 4.

The ECU 3 controls the vehicle 10. In the present embodiment, the ECU 3 controls the vehicle 10 in such a way that the vehicle 10 performs automated driving on the basis of an object detected in a series of images acquired by the camera 2. For this purpose, the ECU 3 includes a communication interface 21, a memory 22, and a processor 23.

The communication interface 21 is an example of a communication unit, and the communication interface 21 includes an interface circuit for connecting the ECU 3 to the in-vehicle network 4. In other words, the communication interface 21 is connected to the camera 2 via the in-vehicle network 4. Every time the communication interface 21 receives an image from the camera 2, the communication interface 21 passes the received image to the processor 23.

The memory 22 is an example of a storage unit, and the memory 22 includes, for example, a volatile semiconductor memory and a non-volatile semiconductor memory. The memory 22 stores various types of data used in the object detection process executed by the processor 23 of the ECU 3, such as images received from the camera 2, various types of parameters for specifying the classifier used in the object detection process, and various types of thresholds used in the object detection process. In addition, the memory 22 may store map information or the like.

The processor 23 is an example of a control unit, and the processor 23 includes one or more CPUs (Central Processing Unit) and a peripheral circuit thereof. The processor 23 may further include another arithmetic circuit such as an arithmetic logic unit, a numeric data processing unit, or a graphics processing unit. Every time the processor 23 receives an image from the camera 2 while the vehicle 10 is traveling, the processor 23 executes a vehicle control process that includes the object detection process on the received image. In addition, the processor 23 controls the vehicle 10 in such a way that the vehicle 10 performs automated driving on the basis of an object detected around the vehicle 10.

Figure 3:
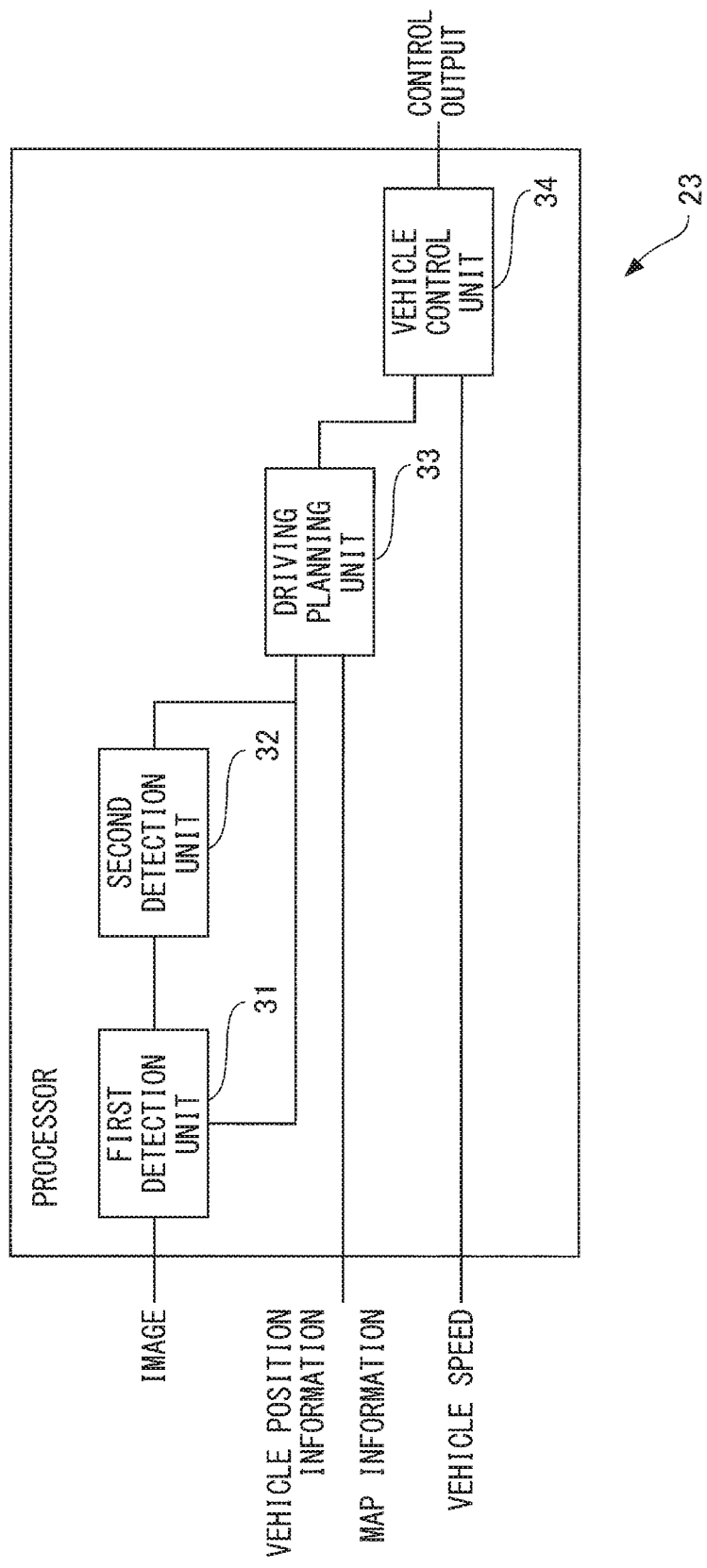
FIG. 3 is a functional block diagram of a processor of the electronic control unit relating to a vehicle control process that includes an object detection process.

FIG. 3 is a functional block diagram of the processor 23 of the ECU 3 relating to the vehicle control process that includes the object detection process. The processor 23 includes a first detection unit 31, a second detection unit 32, a driving planning unit 33, and a vehicle control unit 34. Each of the units included in the processor 23 is a functional module achieved by, for example, a computer program operating on the processor 23. Alternatively, each of the units included in the processor 23 may be a dedicated arithmetic circuit provided in the processor 23. Furthermore, of these units included in the processor 23, the first detection unit 31 and the second detection unit 32 execute the object detection process.

The first detection unit 31 calculates, by inputting the image received from the camera 2 to the classifier, for each of a plurality of regions in the image, a confidence indicating a degree of certainty that an object to be detected is represented in the region, and detects a region, with respect to which the confidence is equal to or higher than the first confidence threshold, as the object region. In addition, the first detection unit 31 calculates the occlusion ratio indicating a ratio of the occluded region in which the object represented in the object region is occluded by another object to the object region.

In the present embodiment, the first detection unit 31 uses as the classifier, a DNN that has been learned in advance in such a way as to calculate, for each of the plurality of regions in the image, the confidence for each type of object to be detected and to calculate the occlusion ratio for the region.

Figure 4:
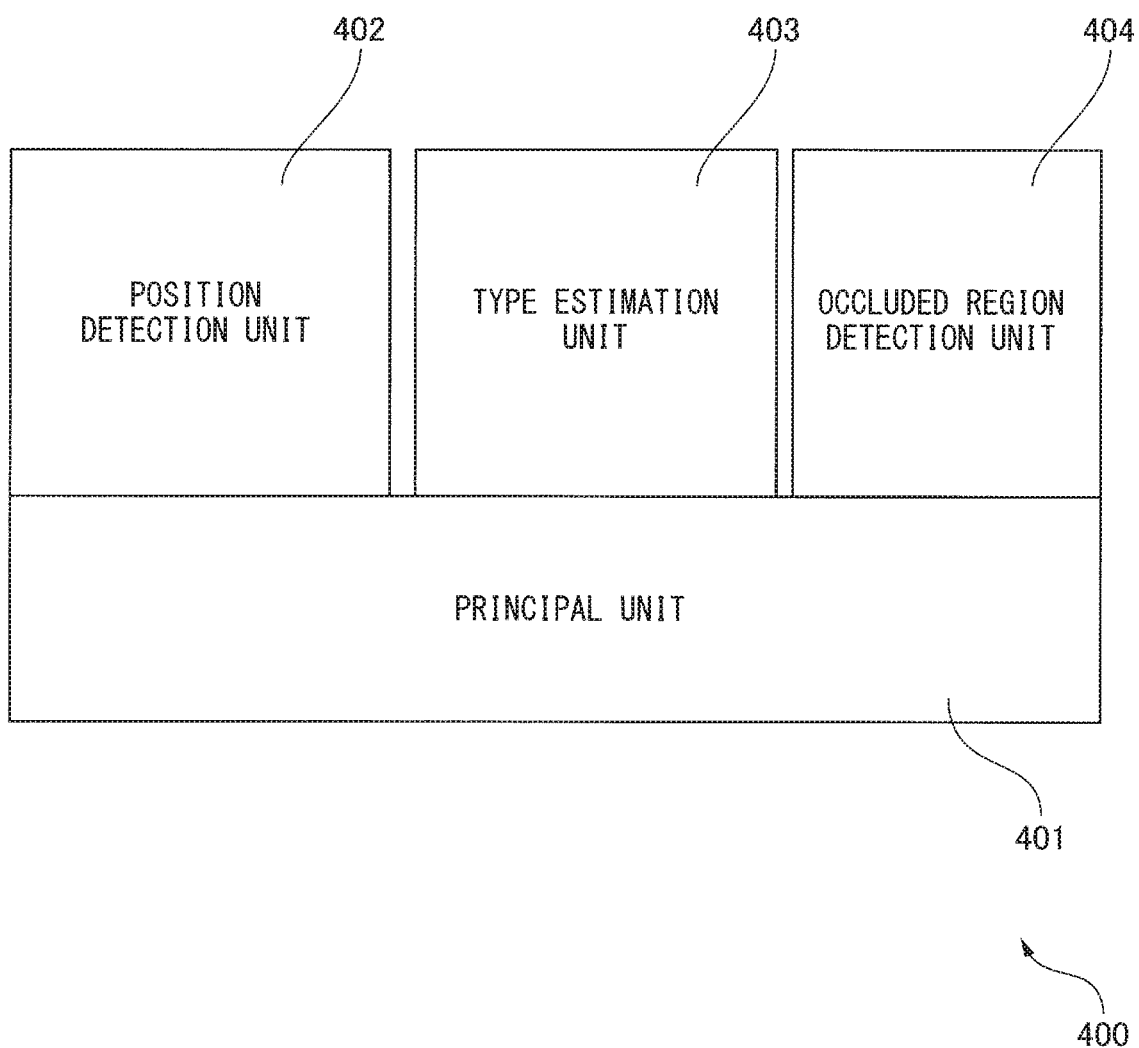
FIG. 4 is a diagram illustrating an example configuration of a DNN used as a classifier.

FIG. 4 is a diagram illustrating an example configuration of the DNN used as the classifier. A DNN 400 includes a principal unit 401 provided on an input side to which an image is input, and a position detection unit 402, a type estimation unit 403, and an occluded region detection unit 404, which are provided on an output side relative to the principal unit 401. The position detection unit 402 outputs, on the basis of an output from the principal unit 401, a rectangle circumscribed to a region in which the object to be detected is represented on the image. The type estimation unit 403 estimates, on the basis of the output from the principal unit 401, a type of the object represented in the region detected by the position detection unit 402. The occluded region detection unit 404 then calculates, on the basis of the output from the principal unit 401, the occlusion ratio for each region. Note that two or more of the position detection unit 402, the type estimation unit 403, and the occluded region detection unit 404 may be integrally formed.

The principal unit 401 may be, for example, a convolutional neural network (CNN) that includes layers that are serially connected from the input side to the output side. The layers include two or more convolutional layers. In addition, the layers included in the principal unit 401 may include a pooling layer provided for every one or more convolutional layers. Furthermore, the layers included in the principal unit 401 may include one or more fully connected layers. For example, the principal unit 401 may have a configuration similar to that of a base layer of a Single Shot MultiBox Detector (SSD) described in NPL 1. In this case, similarly to VGG-16, the principal unit 401 may be configured in the sequence from the input side, two convolutional layers, a pooling layer that performs MaxPooling (i.e., outputting the maximum value of n×n inputs) (hereinafter, referred to simply as a pooling layer), two convolutional layers, a pooling layer, threed convolutional layers, a pooling layer, three convolutional layers, a pooling layer, three convolutional layers, a pooling layer, and three fully connected layers. Alternatively, the principal unit 401 may be configured in accordance with other CNN architectures such as VGG-19, AlexNet, or Network-In-Network.

When an image is input, the principal unit 401 performs a calculation in each layer with respect to the image and outputs a feature map calculated from the image.

To each of the position detection unit 402, the type estimation unit 403, and the occluded region detection unit 404, the feature map output from the principal unit 401 is input. The position detection unit 402, the type estimation unit 403, and the occluded region detection unit 404 may be individually, for example, a CNN that includes a plurality of layers that are serially connected from the input side to the output side. In each of the position detection unit 402, the type estimation unit 403, and the occluded region detection unit 404, the layers included in the CNN include two or more convolutional layers. In addition, in each of the position detection unit 402, the type estimation unit 403, and the occluded region detection unit 404, the layers included in the CNN may include a pooling layer provided for every one or more convolutional layers. Note that the convolutional layers and the pooling layer included in the CNN may be common among two or more of the position detection unit 402, the type estimation unit 403, and the occluded region detection unit 404. Furthermore, in each of the position detection unit 402, the type estimation unit 403, and the occluded region detection unit 404, the layers may include one or more fully connected layers. In this case, the fully connected layer is preferably provided on the output side relative to each convolutional layer. In addition, an output from each convolutional layer may be directly input to the fully connected layer. The output layer of the type estimation unit 403 may be a softmax layer that calculates a confidence for each type of object to be detected according to a softmax function, or the output layer may be a sigmoid layer that calculates a confidence for each type of object to be detected according to a sigmoid function. In contrast, the occluded region detection unit 404 may have, for example, a configuration similar to that of any of CNN architectures used for segmentation. Alternatively, the final layer of the occluded region detection unit 404 may be a softmax layer or a sigmoid layer in which a discrete value of a degree of occlusion is estimated in accordance with a multi-class classification problem (for example, classification into four classes of 0%, 0% to 10%, 10% to 50%, and 50% to 100%, or the like). Alternatively, the final layer of the occluded region detection unit 404 may also be, for example, a linear layer in which a continuous value of the degree of occlusion is estimated in accordance with a regression problem.

For example, the position detection unit 402 and the type estimation unit 403 have been learned in such a way as to output the confidence for each type of object to be detected, with respect to every region of various sizes and various aspect ratios at various positions on the image. Therefore, when an image is input, a classifier 400 outputs the confidence for each type of object to be detected with respect to every region of various sizes and various aspect ratios at various positions on the image. The first detection unit 31 detects a region with respect to which the confidence for the type of any one object is equal to or higher than the first confidence threshold (for example, 0.8 to 0.9) as the object region (first region) in which the object of the type is represented. Note that, when a plurality of object regions in which an object of the same type is represented are detected in one image and those object regions at least partially overlap with each other, the first detection unit 31 may output only the region with respect to which the confidence is maximum among the plurality of object regions.

In contrast, for example, the occluded region detection unit 404 has been learned in such a way as to determine, for each pixel included in every region of various sizes and various aspect ratios at various positions on the image, whether or not the pixel is the one in which the object represented in the region is occluded by another object (hereinafter, referred to as an occluded pixel for the sake of convenience). Therefore, when an image is input, the classifier 400 detects, in each region with respect to which the confidence is calculated by the position detection unit 402 and the type estimation unit 403, an occluded pixel. Therefore, the first detection unit 31 outputs a ratio of the total number of the occluded pixels included in the object region to an area of the object region detected by the position detection unit 402 and the type estimation unit 403 as the occlusion ratio. Note that a set of occluded pixels is referred to as the occluded region below.

Note that the occluded region detection unit 404 may be learned in such a way as to directly calculate, for each region of various sizes and various aspect ratios at various positions on the image, the occlusion ratio for the region. In this case, the occluded region detection unit 404 has been learned in such a way as to estimate a percentage (occlusion ratio) of the region (occluded region) occluded by another object, for example, for each region of various sizes and various aspect ratios at various positions on the image. For estimation of the occlusion ratio, as described above, a method such as a method of estimating a discrete value of a degree of occlusion in accordance with a multi-class classification problem by means of a softmax layer, a sigmoid layer, or the like, or a method of estimating a continuous value of the degree of occlusion in accordance with a regression problem by means of a linear layer is used. Therefore, when an image is input, the classifier 400 calculates, for each region with respect to which the confidence is calculated by the position detection unit 402 and the type estimation unit 403, the occlusion ratio, and the first detection unit 31 outputs the occlusion ratio. Alternatively, the occluded region detection unit 404 may be learned in such a way as to detect, only for the object region detected by the position detection unit 402 and the type estimation unit 403, the occluded region.

Figure 5:
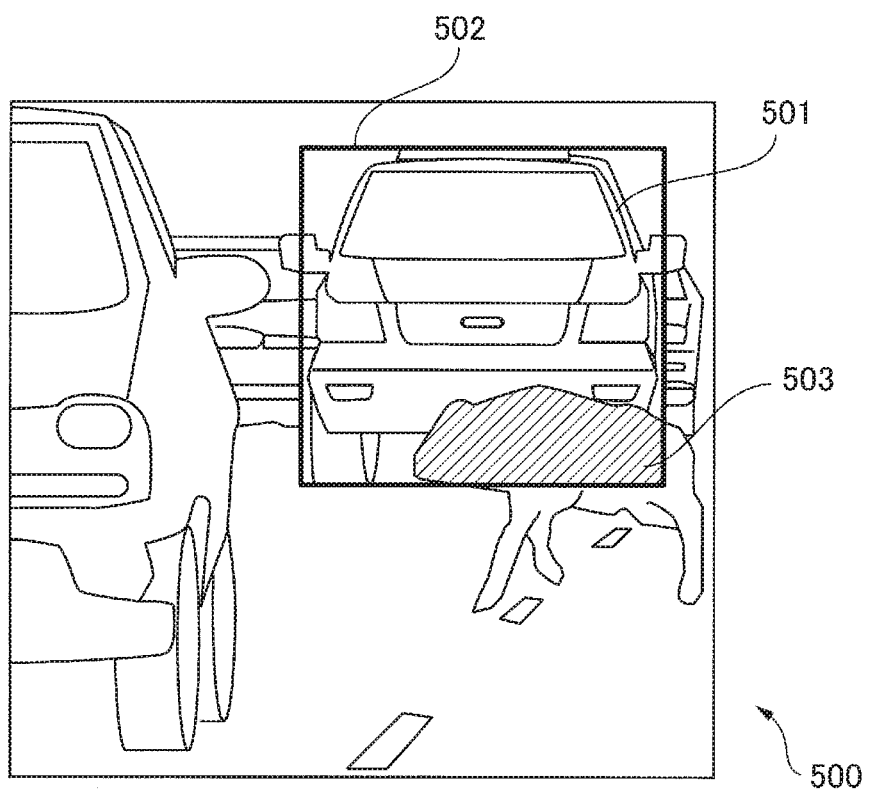
FIG. 5 is a diagram illustrating an example of a teacher image used for learning the classifier illustrated in in FIG. 4.

FIG. 5 is a diagram illustrating an example of an image (teacher image) included in teacher data used for learning the classifier 400 illustrated in in FIG. 4. The teacher image 500 is tagged with a type of the object 501 to be detected (for example, cars, human beings, animals, road signs, road markings, fallen objects, other objects on the road, or the like, and in the illustrated example, cars) and a rectangle 502 circumscribed to the object 501, which indicates the region in which the object 501 is represented. In addition, in the teacher image 500, pixels in the occluded region 503 in which the object 501 is occluded by another object (in this example, an animal) among the pixels included in the region enclosed by the circumscribed rectangle 502 are individually tagged with the occluded pixels.

The classifier 400 has been learned by means of multiple teacher images as illustrated in FIG. 5 in accordance with a learning technique such as the backpropagation method. The first detection unit 31 can detect, by using the classifier 400 that has been learned in this manner, an object to be detected, especially an object for which multiple teacher images can be prepared, in an image with a high degree of accuracy and can detect the occluded region in the object region with a high degree of accuracy.

The first detection unit 31 registers a position and a bound of the object region in which the object to be detected is represented on the image and the type of the object represented in the object region in the detected objects list, which is a list of detected objects. The first detection unit 31 then stores the detected objects list in the memory 22. In addition, the first detection unit 31 outputs the position and the bound of the object region on the image, a position and a bound of the occluded region included in the object region (i.e., the positions of each of the occluded pixels), and the occlusion ratio for the object region to the second detection unit 32. Furthermore, the first detection unit 31 determines a region, which at least partially overlaps with the object region and with respect to which the confidence has been calculated, as the candidate region (second region), and outputs, with respect to each candidate region, a position and a bound of the candidate region on the image and the maximum value of the confidences calculated with respect to the candidate region for respective types of objects to the second detection unit 32.

The second detection unit 32 compares the occlusion ratio calculated for the object region with the occlusion ratio threshold. When the occlusion ratio is equal to or higher than the occlusion ratio threshold, the second detection unit 32 calculates, with respect to a candidate region that includes a predetermined percentage (for example, 70% to 90%) or more of the occluded region included in the object region among candidate regions, a ratio (Intersection over Union, IoU) of an overlapped region between the object region and the candidate region to an area of the sum set of the object region and the candidate region. When the IoU is equal to or higher than the predetermined threshold (for example, 0.05 to 0.3), the second detection unit 32 compares the maximum value of the confidences calculated with respect to the candidate region with the second confidence threshold (for example, a value subtracting 0.1 to 0.2 from the first confidence threshold), which is lower than the first confidence threshold. When the maximum value of the confidences is equal to or higher than the second confidence threshold, the second detection unit 32 determines that an object of the type corresponding to the maximum value of the confidences is represented in the candidate region, and additionally detect the candidate region as the object region. The second detection unit 32 additionally registers a position and a bound of the object region additionally detected on the image and the type of the object represented in the object region additionally detected in the detected objects list to update the detected objects list. The second detection unit 32 stores the updated detected objects list in the memory 22. In this manner, by determining whether or not the IoU with respect to the candidate region is equal to or higher than the predetermined threshold, the second confidence threshold will be applied only to the candidate region that overlaps with the object region by a predetermined percentage or more. Therefore, the second detection unit 32 can suitably determine the candidate region to which the second confidence threshold is applied. Further, by limiting the candidate region to which the second confidence threshold is applied to the one that includes a predetermined percentage or more of the occluded region, the second detection unit 32 can apply the second confidence threshold to the candidate region that is highly likely to include the another object that is assumed to occlude the object represented in the object region.

Note that, when the classifier used by the first detection unit 31 has been learned in such a way as to directly calculate the occlusion ratio without detecting an occluded pixel, the second detection unit 32 may calculate the IoU for each candidate region not depending on whether or not the candidate region includes the occluded region, and determine, on the basis of the IoU, whether or not to apply the second confidence threshold.

Figure 6:
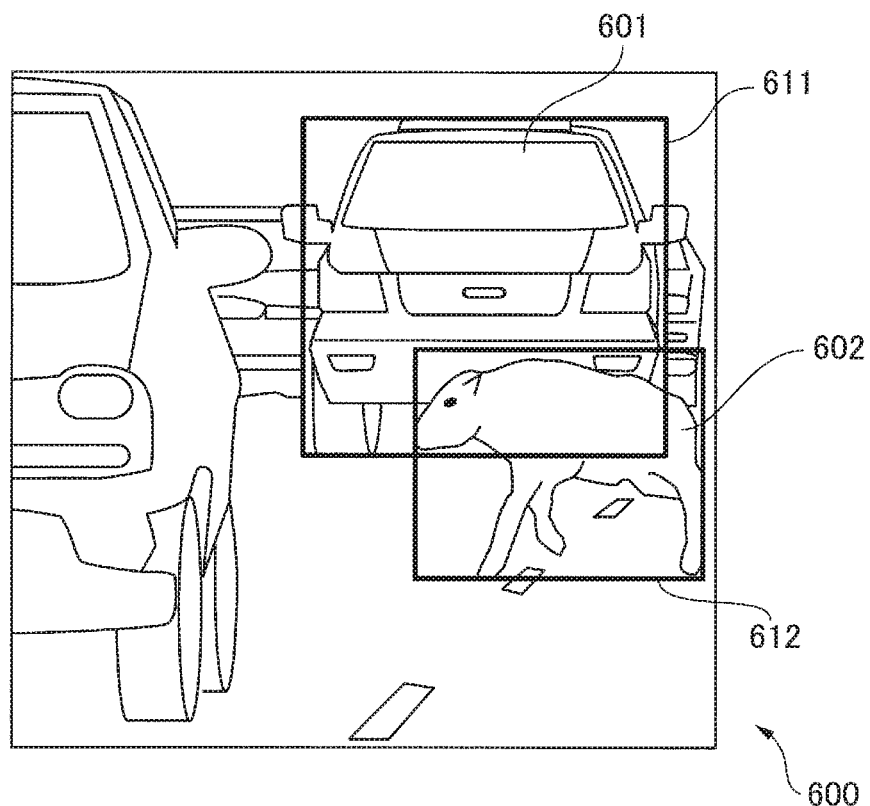
FIG. 6 is a diagram illustrating an example of detecting an object represented in an image.

FIG. 6 is a diagram illustrating an example of detecting an object represented on an image. In image 600, vehicle 601 is represented. In general, since there are a large number of images on which a vehicle is represented, multiple teacher images on which a vehicle is represented may be used for learning the classifier. Therefore, for the region 611 in which the vehicle 601 is represented, a comparatively high confidence is output by the classifier. As a result, the vehicle 601 represented in the region 611 is detected by the first detection unit 31.

However, in the image 600, part of the vehicle 601 is occluded by animal 602. In general, since there are only a small number of images of animals walking on the road, there are comparatively a small number of teacher images on which an animal is represented. In other words, the animal 602 is a rare object. Consequently, with respect to the region 612 in which the animal 602 is represented, the confidence will not be so high. As a result, the animal 602 is not detected by the first detection unit 31. However, since part of the vehicle 601 is occluded by the animal 602, the occlusion ratio for the region 611 is equal to or higher than the occlusion ratio threshold, and the IoU with respect to the region 611 and the region 612 is equal to or higher than the predetermined threshold. Therefore, the second confidence threshold, which is lower than the first confidence threshold, is applied to the region 612, and therefore, the animal 602 represented in the region 612 is detected by the second detection unit 32.

The driving planning unit 33 generates, with reference to the detected objects list obtained for each image, one or more trajectories to be traveled for the vehicle 10 in such a way that the object existing around the vehicle 10 and the vehicle 10 do not collide. The trajectories to be traveled are represented, for example, as a set of target positions for the vehicle 10 at times from the current time to a certain time later. For example, every time the driving planning unit 33 receives an image from the camera 2, the driving planning unit 33 transforms, by executing a viewing transformation process using information on the camera 2 such as the mounting position of the camera 2 in the vehicle 10, the received image into a bird's eye image. The driving planning unit 33 then tracks, by executing a tracking process on a series of bird's eye images using the Kalman filter or the like, the objects registered in the detected objects list for each image, and estimates, on the basis of the path obtained from the tracking result, a trajectory for each object up to a certain time later. The driving planning unit 33 generates, on the basis of the estimated trajectory for each object being tracked, a trajectory to be traveled for the vehicle 10 in such a way that, for any object, an estimated value of the distance between each object being tracked and the vehicle 10 is equal to or greater than a certain distance up to a certain time later. In the process, the driving planning unit 33 may confirm, with reference to, for example, information on a current position of the vehicle 10 acquired from a GPS receiver (not illustrated) installed in the vehicle 10 and map information stored in the memory 22, the number of lanes in which the vehicle 10 can travel. In addition, the driving planning unit 33 may generate the trajectory to be traveled in such a way that, when there are a plurality of lanes in which the vehicle 10 can travel, the vehicle 10 may change lanes in which it travels.

Note that the driving planning unit 33 may generate a plurality of trajectories to be traveled. In this case, the driving planning unit 33 may select a route among the plurality of trajectories to be traveled in such a way that the sum of absolute values of accelerations of the vehicle 10 is minimum.

The driving planning unit 33 informs the vehicle control unit 34 of the generated trajectory to be traveled.

The vehicle control unit 34 controls respective units of the vehicle 10 in such a way that the vehicle 10 travels along the informed trajectory to be traveled. For example, the vehicle control unit 34 calculates a target acceleration of the vehicle 10 according to the informed trajectory to be traveled and a current vehicle speed of the vehicle 10 measured by a vehicle speed sensor (not illustrated), and sets an accelerator position or a brake pedal position to achieve the target acceleration. The vehicle control unit 34 then calculates an amount of fuel consumption according to the set accelerator position, and outputs a control signal corresponding to the amount of fuel consumption to a fuel injection device of an engine of the vehicle 10. Alternatively, the vehicle control unit 34 outputs a control signal corresponding to the set brake pedal position to a brake of the vehicle 10.

The vehicle control unit 34 further calculates, when the vehicle 10 changes its course in order to travel along the trajectory to be traveled, a target steering angle for the vehicle 10 according to the trajectory to be traveled, and outputs a control signal corresponding to the target steering angle to an actuator (not illustrated) that controls a steering wheel of the vehicle 10.

FIG. 7 is an operation flowchart of the vehicle control process that includes the object detection process, executed by the processor 23. Every time the processor 23 receives an image from the camera 2, the processor 23 executes the vehicle control process in accordance with the operation flowchart illustrated in FIG. 7. Note that, in the operation flowchart illustrated below, processing steps from step S101 to step S107 correspond to the object detection process.

The first detection unit 31 of the processor 23 inputs the image to the classifier to calculate, with respect to different regions in the image, a confidence for each type of object to be detected represented in the region and an occlusion ratio (step S101). The first detection unit 31 then detects a region with respect to which the confidence for any type of object is equal to or higher than the first confidence threshold as the object region in which the object of the type is represented, and registers a position and a bound of the object region and the type of the object represented in the object region in the detected objects list (step S102).

The second detection unit 32 of the processor 23 determines whether or not the occlusion ratio for the object region is equal to or higher than the occlusion ratio threshold (step S103). When the occlusion ratio is equal to or higher than the occlusion ratio threshold (step S103—Yes), the second detection unit 32 calculates, with respect to a candidate region that at least partially overlaps with the object region and includes a predetermined percentage or more of the occluded region included in the object region, an IoU (step S104). The second detection unit 32 then determines whether or not the IoU is equal to or higher than the predetermined threshold ThI (step S105). When the IoU is equal to or higher than the predetermined threshold ThI (step S105—Yes), the second detection unit 32 determines whether or not the maximum value of the confidences calculated with respect to the candidate region for respective types of object is equal to or higher than the second confidence threshold, which is lower than the first confidence threshold (step S106). When the maximum value of the confidences is equal to or higher than the second confidence threshold (step S106—Yes), the second detection unit 32 determines that an object of the type corresponding to the maximum value of the confidences is represented in the candidate region. The second detection unit 32 then determines the candidate region as the object region, and additionally registers a position and a bound of the object region on the image and the type of the object represented in the object region in the detected objects list (step S107).

After step S107, the driving planning unit 33 of the processor 23 tracks, with reference to the detected objects list, the objects registered in the detected objects list, and generates a trajectory to be traveled for the vehicle 10 in such a way that the trajectory to be traveled is separated from the estimated trajectories of the objects estimated on the basis of the tracking result by a certain distance or more (step S108). Then, the vehicle control unit 34 of the processor 23 controls the vehicle 10 in such a way that the vehicle 10 travels along the trajectory to be traveled (step S109). Then, the processor 23 ends the vehicle control process.

Note that, when the occlusion ratio is less than the occlusion ratio threshold in step S103 (step S103—No), when the IoU is less than the threshold ThI in step S105 (step S105—No), or when the maximum value of the confidences calculated with respect to the candidate region for respective types of object is less than the second confidence threshold in step S106 (step S106—No), the processor 23 may execute processing after step S107.

When the first detection unit 31 detects a plurality of objects in the image, the processor 23 may execute, for each object region in which the detected object are represented, processing from steps S102 to S107.

As described above, when an occlusion ratio for an object region in which a detected object is represented on an image is equal to or higher than a predetermined occlusion ratio threshold and an IoU with respect to the object region and a candidate region is equal to or higher than a predetermined threshold, the object detection device applies a second confidence threshold, which is lower than a first confidence threshold, to the candidate region. Furthermore, the object detection device determines, when the confidence calculated with respect to the candidate region for an any type of object is equal to or higher than the second confidence threshold, that an object to be detected is also represented in the candidate region. In this manner, even if a rare object is captured in the candidate region, the object detection device can prevent failure in detecting the rare object, thereby improving detection accuracy. In addition, since the object detection device can determine whether or not the object to be detected is represented in the candidate region by executing processing requiring comparatively a large amount of calculation by the classifier only once, the object detection device can suppress the amount of calculation.

Note that a plurality of cameras may be provided in the vehicle 10. In this case, the processor 23 may execute, for each camera, the object detection process by the first detection unit 31 and the second detection unit 32 on an image acquired by the camera. In addition, the processor 23 may execute, on the basis of the object detected in the image acquired by each camera, processing by the driving planning unit 33 and the vehicle control unit 34.

According to a variation, the first detection unit 31 may detect an object region and a candidate region as well as calculate an occlusion ratio and a confidence by using a classifier other than a DNN. For example, the first detection unit 31 may use, as the classifier, a support-vector machine (SVM) that has been learned in advance in such a way as to output, using a feature (for example, Histograms of Oriented Gradients, HOG) calculated with respect to a window set on an image as an input, the confidence for whether an object to be detected is represented in the window. The first detection unit 31 variously changes a position, a size, and an aspect ratio of the window set on the image, calculates the feature with respect to the window, and calculates the confidence with respect to the window by inputting the calculated feature to the SVM. The first detection unit 31 then determines, when the confidence is equal to or higher than the first confidence threshold, the window as the object region. Note that the SVM may be prepared for each type of object to be detected. In this case, the first detection unit 31 may calculate, for each window, the confidence for each type of object by inputting the feature calculated with respect to the window to each SVM. The first detection unit 31 may determine, when the maximum value of the confidences for respective types of objects is compared with the first confidence threshold and the maximum value is higher than the first confidence threshold, that an object of the type corresponding to the maximum value is represented in the window.

In addition, the first detection unit 31 divides a template for the object to be detected into a plurality of sub templates, performs template matching against the object region for each of sub templates, and calculates, for each of sub templates, degrees of similarity between the sub template and the object region such as a value of normalized cross correlation. The first detection unit 31 then obtains a remaining region obtained by excluding a region for which the degree of similarity with any of the sub templates is equal to or higher than a predetermined degree of similarity threshold from the object region as the occluded region. Therefore, the first detection unit 31 may calculate a ratio of an area of the remaining region (i.e., the occluded region) to the area of the object region as the occlusion ratio. Note that the template for the object to be detected is, for example, stored in the memory 22 in advance.

In this variation, the second detection unit 32 determines each window that at least partially overlaps with the object region for which the occlusion ratio is equal to or higher than the occlusion ratio threshold as a candidate region. Alternatively, the second detection unit 32 may determine a window that at least partially overlaps with the object region for which the occlusion ratio is equal to or higher than the occlusion ratio threshold and that includes a predetermined percentage or more of the remaining region as a candidate region. The second detection unit 32 then calculates, in a similar fashion to the embodiments described above, the IoU for each candidate region, and when the calculated IoU is equal to or higher than the predetermined threshold, the second detection unit 32 may compare the confidence calculated with respect to the candidate region with the second confidence threshold. Furthermore, the second detection unit 32 may determine, when the confidence calculated with respect to the candidate region is equal to or higher than the second confidence threshold, that the object to be detected is represented in the candidate region.

According to another variation, the second detection unit 32 may calculate, for the object region and the candidate region, a ratio of the area of the overlapped region between the object region and the candidate region to the area of the object region, instead of calculating the IoU. In addition, the second detection unit 32 may apply the second confidence threshold to the candidate region when the ratio is equal to or higher than a predetermined threshold for an overlapping ratio. According to this variation, even when the candidate region is relatively small compared with the object region, the second confidence threshold will be more likely to be applied to the candidate region. As a result, the second detection unit 32 can improve detection accuracy even for a rare object that is relatively small compared with the object represented in the object region.

According to still another variation, the occlusion ratio threshold may be set in accordance with the type of the object represented in the object region detected by the first detection unit 31. For example, there is a relatively high possibility that an object that is likely to exist on the road such as cars, human beings, motorcycles, bicycles, or road markings is occluded by another object existing on the road. In contrast, there is a relatively low possibility that an object that is likely to exist at a position higher than the road by a certain height such as traffic lights or road signs is occluded by another object existing on the road. In view of this, a value of the occlusion ratio threshold for the object that is likely to exist on the road may be set lower than that for the object that is likely to exist at a position higher than the road by a certain height. In this case, the occlusion ratio threshold for the type of the object is stored in the memory 22 in advance in association with the type of the object. The first detection unit 31 may read out the occlusion ratio threshold for the type of the object represented in the object region from the memory 22 and use the occlusion ratio threshold for comparison with the occlusion ratio.

As an object is located farther from the vehicle 10, it is less likely that the object has an effect on traveling of the vehicle 10. In contrast, as the number of objects detected is smaller, the amount of calculation at the driving planning unit 33 is reduced. In view of this, the occlusion ratio threshold may be set in such a way that, as the object represented in the candidate region is located farther from the vehicle 10, the object is unlikely to be detected. For example, when the object which is represented in the object region of interest is an object that is likely to exist on the road such as cars and there is another object region in which an object that is likely to exist on the road is represented within a certain distance from the object region of interest, as the size of the object region of interest is smaller, the occlusion ratio threshold may be set to a higher value. In this manner, the second confidence threshold is unlikely to be applied to the candidate region located around the object region in which an object far from the vehicle 10 is represented, and detection of the rare object far from the vehicle 10 is prevented. As a result, increase of the amount of calculation at the driving planning unit 33 is prevented.

Alternatively, when the traveling direction of the object represented in the object region of interest is substantially orthogonal to the lane in which the vehicle 10 is traveling, or when the object represented in the object region of interest is laterally oriented, the occlusion ratio threshold may be set to a relatively high value. In this manner, detection of the rare object that is unlikely to have an effect on traveling of the vehicle 10 is prevented. In this case, the first detection unit 31 may obtain, by executing a process similar to the tracking process executed by the driving planning unit 33 on the object represented in the object region of interest, the traveling direction of the object. Alternatively, the first detection unit 31 may determine, when a ratio of a lateral size of the object region of interest to a vertical size thereof is equal to or higher than a predetermined ratio, that the object represented in the object region of interest is laterally oriented. Alternatively, the classifier itself may be learned in such a way as to detect a laterally oriented object as one of the types of objects to be detected. In this case, when the object represented in the object region of interest is a laterally oriented object, the first detection unit 31 may determine that the object represented in the object region of interest is laterally oriented.

According to yet still another variation, the second detection unit 32 may set, as the occlusion ratio for the object region of interest is higher, the second confidence threshold applied to the candidate region that at least partially overlaps with the object region to a lower value. As the occlusion ratio is higher, it is more likely that the object represented in the object region of interest is occluded by another object. Therefore, by adjusting the second confidence threshold in accordance with the occlusion ratio as described above, the second detection unit 32 can detect another object occluding the object represented in the object region of interest with a higher degree of accuracy.

Alternatively, when the object which is represented in the object region of interest is an object that is likely to exist on the road such as cars and there is another object region in which an object that is likely to exist on the road is represented within a certain distance from the object region of interest, as the size of the object region of interest is smaller, the second confidence threshold may be set to a higher value. In this manner, in the candidate region located around the object region in which an object far from the vehicle 10 is represented, detection of the rare object is prevented.

Alternatively, when the traveling direction of the object represented in the object region of interest is substantially orthogonal to the lane in which the vehicle 10 is traveling, or when the object represented in the object region of interest is laterally oriented, the second confidence threshold may be set to a value higher than that in a case where the traveling direction of the object represented in the object region of interest is substantially parallel to the lane in which the vehicle 10 is traveling. In this manner, detection of the rare object that is unlikely to have an effect on traveling of the vehicle 10 is prevented. In this case, the second detection unit 32 may obtain, by executing a process similar to the tracking process executed by the driving planning unit 33 on the object represented in the object region of interest, the traveling direction of the object. Alternatively, the second detection unit 32 may determine, when a ratio of a lateral size of the object region of interest to a vertical size thereof is equal to or higher than a predetermined ratio, that the object represented in the object region of interest is laterally oriented. Alternatively, the classifier itself may be learned in such a way as to detect a laterally oriented object as one of the types of the object to be detected. In this case, when the object represented in the object region of interest is a laterally oriented object, the second detection unit 32 may determine that the object represented in the object region of interest is laterally oriented.

Alternatively, the second detection unit 32 may set the second confidence threshold in accordance with a relative positional relationship of the candidate region relative to the object region. For example, when a lower side of the object represented in the object region is occluded by another object, it is highly likely that the another object is an object that has an effect on traveling of the vehicle 10, such as a fallen object that exists on the road. In view of this, the second confidence threshold in a case where the candidate region includes at least part of the lower side of the object region may be set to a value lower than that in a case where the candidate region includes at least part of the left side or the right side of the object region. In this manner, the second detection unit 32 can improve accuracy in detecting the rare object that is likely to have an effect on traveling of the vehicle 10. In contrast, when the upper side of the object represented in the object region is occluded by another object, it is highly likely that the another object is an object that does not have an effect on traveling of the vehicle 10, such as a tree branch or a signboard. In view of this, the second confidence threshold in a case where the candidate region includes at least part of the upper side of the object region may be set to a value higher than that in a case where the candidate region includes at least part of the left side or the right side of the object region. In this manner, the second detection unit 32 can prevent detection of the rare object that is unlikely to have an effect on traveling of the vehicle 10. Note that, when the candidate region includes a plurality of sides of the object region, the second confidence threshold may be set, for example, to the minimum value of values of the second confidence thresholds corresponding to respective sides of the object region included in the candidate region.

Alternatively, the second confidence threshold may be set in accordance with the type of the object represented in the object region detected by the first detection unit 31 or the type and a behavior thereof. For example, when a car is parked on the road, an object such as a human being may pass the forward side, viewed from the vehicle 10, of the parked vehicle. In such a case, the object that passes the forward side of the parked vehicle may have an effect on traveling of the vehicle 10. Therefore, detection of the object is preferable. In view of this, the second detection unit 32 may set the second confidence threshold in a case where the object represented in the object region of interest is a particular type of object (for example, cars) to a value lower than that in a case where the type of object represented in the object region of interest is a type other than the particular type. Alternatively, the second detection unit 32 may set the second confidence threshold in a case where the object represented in the object region of interest is a particular type of object and a behavior of the object represented in the object region satisfies a predetermined condition to a value lower than that in other cases. The predetermined condition is, for example, that the object represented in the object region of interest remains still. In this case, the second detection unit 32 may determine, by executing the tracking process on the object represented in the object region of interest, whether or not the object remains still.

According to yet still another variation, the object detection device according to the embodiments or the variations described above may be installed in a place other than an in-vehicle device. For example, the object detection device according to the embodiments or the variations described above may be configured to detect an object in an image generated by a monitoring camera installed in such a way that the monitoring camera images an outdoor or indoor predetermined region at every a certain period. When an object is detected for a definite period, the object detection device may display, on a display connected to the object detection device, a message indicating that the object is detected or output, to a speaker connected to the object detection device, a sound indicating that the object is detected.

Furthermore, a computer program for achieving functions of respective units of the processor 23 of the object detection device according to the embodiments or the variations described above may be provided in a form recorded in a computer-readable portable recording medium such as a semiconductor memory, a magnetic recording medium, or an optical recording medium.

As described above, those skilled in the art may make various modifications according to embodiments within the scope of the present invention.

What is claimed is:
1. An object detection device comprising:
a processor configured to:
  calculate, for each of a plurality of regions in an input image, a confidence indicating a degree of certainty that an object to be detected is represented;
  determine that the object is represented in a first region, among the plurality of regions, with respect to which the confidence is equal to or higher than a first confidence threshold;
  calculate an occlusion ratio indicating a ratio of an occluded region, in which the object is occluded in the first region by another object, to the first region; and
  determine that the object is represented in a second region, among the plurality of regions, which at least partially overlaps with the first region, when the occlusion ratio is equal to or higher than an occlusion ratio threshold and the confidence with respect to the second region is equal to or higher than a second confidence threshold which is lower than the first confidence threshold, wherein the processor estimates a type of the object represented in the first region and sets the occlusion ratio threshold in accordance with the estimated type.

2. The object detection device according to claim 1, wherein the processor calculates, by inputting the image to a classifier that has been learned in advance in such a way as to detect the object in the image and to detect the occluded region, the occlusion ratio.

3. The object detection device according to claim 2, wherein the classifier comprises a first convolutional neural network to which the image is input, a second convolutional neural network that calculates the confidence with respect to each of the plurality of regions, based on an output from the first convolutional neural network, and a third convolutional neural network that detects the occluded region, based on an output from the first convolutional neural network.

4. The object detection device according to claim 1, wherein the processor determines that the object is represented in the second region, when a ratio of an overlapped region between the first region and the second region to a sum set of the first region and the second region is equal to or higher than a predetermined threshold and the confidence with respect to the second region is equal to or higher than the second confidence threshold.

5. The object detection device according to claim 1, wherein the processor determines that the object is represented in the second region, when a ratio of an overlapped region between the first region and the second region to the first region is equal to or higher than a predetermined threshold and the confidence with respect to the second region is equal to or higher than the second confidence threshold.

6. The object detection device according to claim 1, wherein the processor determines a region, among the plurality of regions, which at least partially overlaps with the first region and which includes at least part of the occluded region as the second region.

7. The object detection device according to claim 1, wherein the processor sets the second confidence threshold to a lower value as the occlusion ratio is higher.

8. The object detection device according to claim 1, wherein the processor sets the second confidence threshold in accordance with a relative positional relationship of the second region relative to the first region.

9. An object detection method comprising:
calculating, for each of a plurality of regions in an input image, a confidence indicating a degree of certainty that an object to be detected is represented;
determining that the object is represented in a first region, among the plurality of regions, with respect to which the confidence is equal to or higher than a first confidence threshold;
calculating an occlusion ratio indicating a ratio of an occluded region, in which the object is occluded in the first region by another object, to the first region;
determining that the object is represented in a second region, among the plurality of regions, which at least partially overlaps with the first region, when the occlusion ratio is equal to or higher than an occlusion ratio threshold and the confidence with respect to the second region is equal to or higher than a second confidence threshold which is lower than the first confidence threshold;
estimating a type of the object represented in the first region; and
setting the occlusion ratio threshold in accordance with the estimated type.

10. A non-transitory computer-readable recording medium having recorded thereon a computer program for object detection that causes a computer to execute a process comprising:
calculating, for each of a plurality of regions in an input image, a confidence indicating a degree of certainty that an object to be detected is represented;
determining that the object is represented in a first region, among the plurality of regions, with respect to which the confidence is equal to or higher than a first confidence threshold;
calculating an occlusion ratio indicating a ratio of an occluded region, in which the object is occluded in the first region by another object, to the first region;
determining that the object is represented in a second region, among the plurality of regions, which at least partially overlaps with the first region, when the occlusion ratio is equal to or higher than an occlusion ratio threshold and the confidence with respect to the second region is equal to or higher than a second confidence threshold which is lower than the first confidence threshold;
estimating a type of the object represented in the first region; and
setting the occlusion ratio threshold in accordance with the estimated type.

* * * * *